US010003226B2

(12) United States Patent
Kim et al.

(10) Patent No.: US 10,003,226 B2
(45) Date of Patent: Jun. 19, 2018

(54) MOTOR

(71) Applicant: SAMSUNG ELECTRONICS CO., LTD., Suwon-si, Gyeonggi-do (KR)

(72) Inventors: Sung Il Kim, Yongin-si (KR); Seong Taek Lim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 652 days.

(21) Appl. No.: 14/537,221

(22) Filed: Nov. 10, 2014

(65) Prior Publication Data

US 2015/0145371 A1 May 28, 2015

(30) Foreign Application Priority Data

Nov. 25, 2013 (KR) .................. 10-2013-0143790

(51) Int. Cl.
H02K 1/27 (2006.01)

(52) U.S. Cl.
CPC ............ *H02K 1/276* (2013.01); *H02K 1/2766* (2013.01)

(58) Field of Classification Search
CPC .. H02K 1/22; H02K 1/24; H02K 1/27; H02K 1/274; H02K 1/276; H02K 1/2766; H02K 1/277; H02K 1/2773; H02K 1/278; H02K 1/28; H02K 21/12; H02K 21/14; H02K 21/16; H02K 21/20
See application file for complete search history.

(56) References Cited

U.S. PATENT DOCUMENTS

| 7,868,502 | B2* | 1/2011 | Lee | H02K 1/276 310/156.48 |
| 2007/0126304 | A1* | 6/2007 | Ito | H02K 1/2766 310/156.53 |
| 2007/0252467 | A1* | 11/2007 | Hoemann | H02K 1/276 310/156.53 |
| 2008/0231135 | A1* | 9/2008 | Suzuki | H02K 1/2766 310/156.53 |
| 2011/0309706 | A1* | 12/2011 | Takahashi | H02K 1/276 310/156.53 |

FOREIGN PATENT DOCUMENTS

| CN | 101272066 | 9/2008 | |
| EP | 1973217 | 9/2008 | |
| EP | 2378632 | 10/2011 | |
| EP | 2615724 | 7/2013 | |
| JP | 2008199790 A | * 8/2008 | ............... H02K 1/27 |

(Continued)

OTHER PUBLICATIONS

European Patent Office Communication dated Jan. 27, 2017, from European Patent Application No. 14194404.1, 5 pages.

(Continued)

*Primary Examiner* — Tran Nguyen
(74) *Attorney, Agent, or Firm* — Staas & Halsey LLP

(57) ABSTRACT

A motor includes a cylindrical stator having a hollow, and a rotor rotatably arranged inside the stator. The rotor includes a cylindrical rotor body, a permanent magnet group provided to the rotor body to generate a magnetic field, and a flux barrier group to interrupt magnetic flux. The rotor body, the permanent magnet group and the flux barrier group are asymmetrically formed with respect to a center of poles of the rotor.

18 Claims, 11 Drawing Sheets

(56) References Cited

FOREIGN PATENT DOCUMENTS

| | | | |
|---|---|---|---|
| JP | 2011-223742 | 11/2011 | |
| JP | 2011223742 A * | 11/2011 | ............... H02K 1/17 |
| WO | 2009/038714 | 3/2009 | |

OTHER PUBLICATIONS

Extended European Search report dated Jun. 1, 2016 from European Patent Application No. 14194404.1, 7 pages.
European Communication dated Nov. 7, 2017 in European Patent Application No. 14194404.1.
Chinese Office Action dated Feb. 2, 2018 in Chinese Patent Application No. 201410688149.3.

* cited by examiner

MOTOR

CROSS-REFERENCE TO RELATED APPLICATIONS

This application claims the benefit of Korean Patent Application No. 10-2013-0143790, filed on Nov. 25, 2013 in the Korean Intellectual Property Office, the disclosure of which is incorporated herein by reference.

BACKGROUND

1. Field

Embodiments disclosed herein relate to an interior permanent magnet (IPM) motor having a permanent magnet provided in the rotor.

2. Description of the Related Art

Motors are widely used in appliances (e.g., home appliances, commercial appliances, etc.) including a laundry machine, a refrigerator, an air conditioner, a cleaner, and the like. They are used also in electric vehicles and hybrid vehicles, which have recently attracted attention.

A motor may be designed to rotate unidirectionally or bidirectionally depending upon products in which the motor is used. For example, high performance for bidirectional rotation is required for motors used in laundry machines and cleaners since the motors need to rotate bidirectionally.

In contrast, most of the motors used in compressors for refrigerators and air conditioners only need to rotate unidirectionally. In addition, in the case of an electric vehicle or hybrid vehicle, high performance is required for the motor used in the vehicle when the vehicle moves forward, while performance as high as in the forward movement is not required when the vehicle moves backward.

Even in the case that a motor only needs to rotate unidirectionally or high performance is not required in one of the two directions in which the motor rotates, the motor may have almost the same structure as a bidirectional motor.

SUMMARY

Therefore, it is an aspect of the disclosure to provide a motor provided with an asymmetric structure to improve performance of unidirectional rotation and to reduce manufacturing costs.

Additional aspects of the disclosure will be set forth in part in the description which follows and, in part, will be apparent from the description, or may be learned from practice of the disclosure.

In accordance with an aspect of the disclosure, a motor may include a cylindrical stator, and a rotor rotatably arranged inside the stator, wherein the rotor may include a cylindrical rotor body, a permanent magnet group provided to the rotor body to generate a magnetic field, and a flux barrier group to interrupt magnetic flux, wherein the rotor body, the permanent magnet group and the flux barrier group are asymmetrically formed with respect to a center of poles of the rotor.

The permanent magnet group may be embedded in the rotor body.

The permanent magnet group may include a first permanent magnet disposed in the rotor body such that a magnetic field is created in a radial direction of the rotor body.

The center of poles of the rotor may be located at a center of the first permanent magnet.

The permanent magnet group may further include at least two permanent magnets asymmetrically disposed at opposite ends of the first permanent magnet.

The at least two permanent magnets may create asymmetric magnetic fields around the first permanent magnet.

The at least two permanent magnets may include a second permanent magnet positioned at a side of the first permanent magnet facing in a direction opposite to a direction of rotation and a third permanent magnet positioned at the other side of the first permanent magnet facing in the direction of rotation, the third permanent magnet creating a greater magnetic field than the second permanent magnet.

A size of the third permanent magnet may be greater than a size of the second permanent magnet.

The flux barrier group may include a plurality of magnetic flux barriers asymmetrically disposed at opposite ends of the permanent magnet group.

A magnetic flux barrier of the plurality of magnetic flux barriers disposed at one side of the permanent magnet group facing in a direction opposite to a direction of rotation may interrupt more magnetic flux than another magnetic flux barrier disposed at the other side of the permanent magnet group facing in the direction of rotation.

The number of magnetic flux barriers disposed at one side of the permanent magnet group facing in the direction opposite to the direction of rotation may be greater than the number of magnetic flux barriers disposed at the other side of the permanent magnet group facing in the direction of rotation.

A distance between an outer circumferential surface of the rotor body and a center of the rotor body may vary depending upon positions on the outer circumferential surface.

A position on the outer circumferential surface defining the longest distance between the outer circumferential surface and the center of the rotor body may be spaced a predetermined angle from the center of poles of the rotor in a direction of rotation of the rotor.

A width of an air gap between the rotor and the stator may vary along an outer circumferential surface of the rotor.

A position on the rotor defining the smallest width of the air gap may be spaced a predetermined angle from the center of poles of the rotor in a direction of rotation of the rotor.

In accordance with an aspect of the disclosure, a motor may include a stator and a rotor rotatably arranged inside the stator, wherein the rotor comprises a rotor body, a permanent magnet group provided to the rotor body to generate a magnetic field, and a flux barrier group to interrupt magnetic flux. A size of an air gap formed between the stator and an outer circumference of the rotor body may vary.

A plurality of permanent magnet groups may be provided to the rotor body, and a size of the air gap at a portion of the rotor body between adjacent permanent magnet groups may be greater than a size of the air gap at a portion of the rotor body which corresponds to a central portion of a permanent magnet group.

The permanent magnet group may include a first permanent magnet, a second permanent magnet disposed on one side of the first permanent magnet, and a third permanent magnet disposed on the other side of the first permanent magnet, and a size of the third permanent magnet may be greater than a size of the second permanent magnet.

The flux barrier group may include a first flux barrier disposed on one end of the permanent magnet group, a second flux barrier disposed on the other end of the permanent magnet group, and a third flux barrier disposed between the first flux barrier and the one end of the permanent magnet group. A fourth flux barrier may be disposed adjacent to the one end of the permanent magnet group, at a side of the permanent magnet group closer to the outer circumference of the rotor body than a center of the rotor body.

In accordance with an aspect of the disclosure, a motor may include a stator, and a rotor rotatably arranged inside the stator, wherein the rotor comprises a rotor body, a permanent magnet group provided to the rotor body to generate a magnetic field, and a flux barrier group to interrupt magnetic flux. The permanent magnet group may include at least one permanent magnet having a different size than another permanent magnet, and the flux barrier group may include a greater number of flux barriers disposed at one end of the permanent magnet group than at the other end of the permanent magnet group.

BRIEF DESCRIPTION OF THE DRAWINGS

These and/or other aspects of the disclosure will become apparent and more readily appreciated from the following description of the example embodiments, taken in conjunction with the accompanying drawings of which.

DETAILED DESCRIPTION

Figure 1:
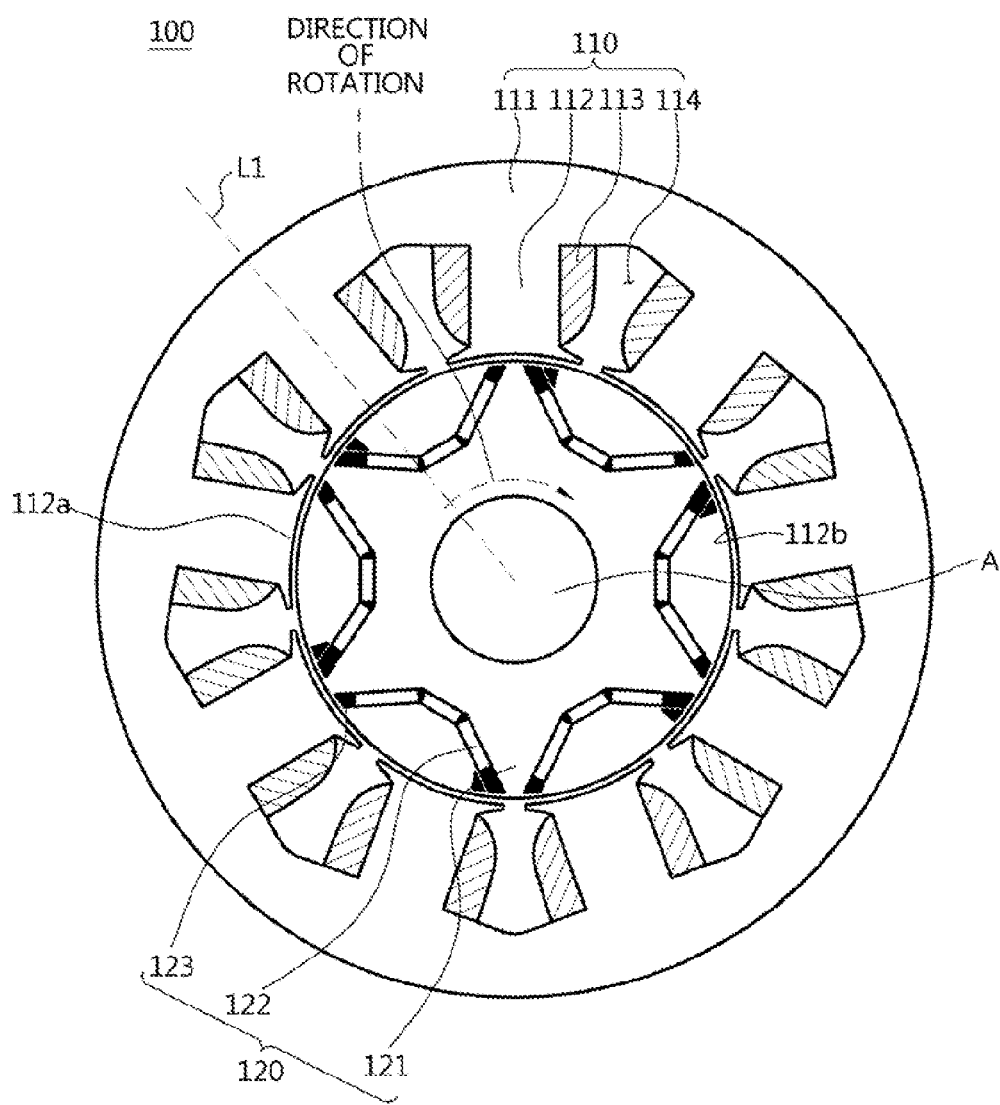
FIG. 1 is a cross-sectional view illustrating a motor according to an embodiment of the disclosure.

Reference will now be made in detail to embodiments, examples of which are illustrated in the accompanying drawings, wherein like reference numerals refer to like elements throughout. The example embodiments are described below to explain the disclosure by referring to the figures.

It should be understood that embodiments disclosed in this specification and constituents shown in the accompanying drawings are simply illustrative and there may be many variations which may be applicable to the embodiments and drawings of this specification at the time of filing of this application.

FIG. 1 is a cross-sectional view illustrating a motor according to an exemplary embodiment of the disclosure.

As shown in FIG. 1, a motor 100 according to an embodiment may include a stator 110 fixed by an external support structure, a rotor 120 adapted to rotate through magnetic interaction with the stator 110, and a shaft A to transmit the rotational power of the rotor 120 to an external load. In addition, the motor 100 may be an inner type motor having the cylindrical rotor 120 positioned in the cylindrical stator 110.

The stator 110 may be formed in the shape of a cylinder having a hollow portion, and the rotor 120 may be rotatably inserted into the hollow portion of the stator 110.

As shown in FIG. 1, the stator 110 may include an annular stator body 111, teeth 112 protruding from the stator body 111 toward the shaft A, and a coil 113 surrounding the outer surfaces of the teeth 112.

The stator body 111 may be formed in a cylindrical shape and fixed to the inner surface of a motor case (not shown).

The teeth 112 may protrude radially from the inner circumferential surface of the stator body 111 toward the rotor 120. Specifically, as shown in FIG. 1, the teeth 112 may protrude from the stator body 111 such that a line L1 extending through the center of each of the teeth 112 crosses the center of the shaft A.

The teeth 112 may be integrated with (integrally formed together with) the stator body 111. The stator body 111 and the teeth 112 may be fabricated by stacking metal plates having the shape of the stator body 111 and the teeth 112 facing the shaft A.

In addition, an end of each of the teeth 112 may be provided with a tooth wide width portion 112a protruding to both sides of each of the teeth 112. Particularly, the tooth wide width portions 112a may be provided such that teeth end surfaces 112b of the teeth 112 facing the rotor 110 are arranged along an imaginary circumference around the shaft A. As the tooth wide width portion 112a are formed at the ends of the teeth 112, the area of the stator 110 facing the rotor 110 may increase.

The teeth 112 may be disposed along the inner circumferential surface of the stator body 111 and may be equally spaced from each other. Slots 114 may be defined between neighboring teeth 112. The coil 113 may be formed by winding a wire around the outer surfaces of the teeth 112 through the slots 114 defined between neighboring teeth 112. A distance between ends of adjacent teeth 112 may be reduced for teeth which include the tooth wide width portion 112a protruding to both sides of each of the teeth 112, compared to a distance between ends of adjacent teeth which do not include the tooth wide width portion.

The coil 113 may be formed by winding a wire formed of an electrically conductive material around the outer surfaces of the teeth 112. When electric current flows through the coil 113, a magnetic field may be created at the interior of the coil 113, i.e., the teeth 112 in a direction perpendicular to the tooth end surface 112b.

As shown in FIG. 1, the motor 100 may include nine teeth 112. Accordingly, the motor 100 may include nine slots 114. However, the disclosure is not so limited. For example, the motor may have more than nine teeth or less than nine teeth. Likewise, the motor may have more than nine slots or less than nine slots.

As described above, the rotor 120 may be arranged in the hollow portion of the stator 110. The rotor 120 may rotate about the shaft A by magnetically interacting with the stator 110.

As shown in FIG. 1, the rotor 120 may include a cylindrical rotor body 121 and a permanent magnet group 122 arranged in the rotor body 121. In addition, the rotor body 121 may be provided with a flux barrier group 123 adjoining the permanent magnet group 122.

As the rotor 120 is provided therein with the permanent magnet group 122, the motor 100 may be defined as a permanent magnet (PM) motor. Particularly, the motor 100 may be an interior permanent magnet (IPM) motor having the permanent magnet group 122 embedded in the rotor body 121.

To aid in understanding of the structure of the rotor 120, the rotor 120 will be described in more detail below through comparison with the rotor of a conventional motor.

Figure 2:
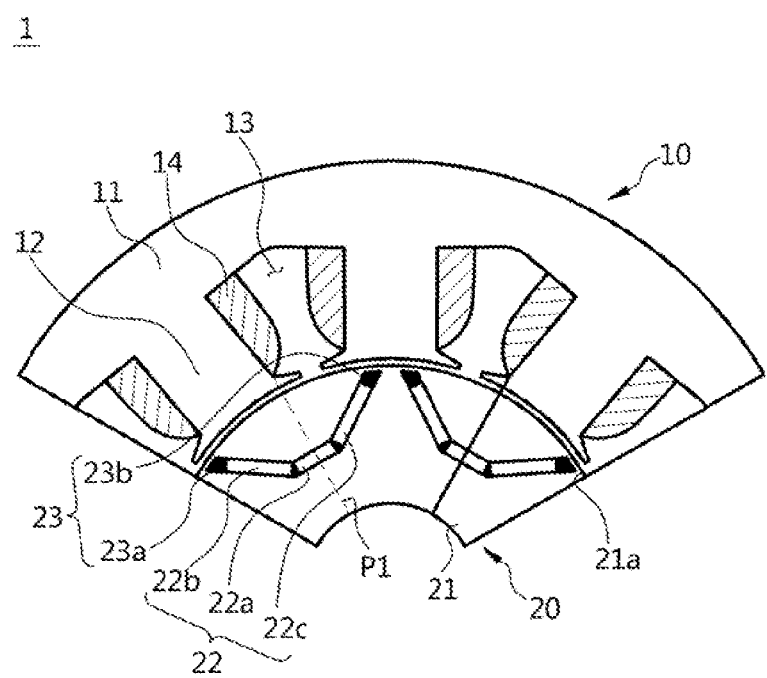
FIG. 2 is a partial cross-sectional view illustrating a conventional motor.
Figure 3:
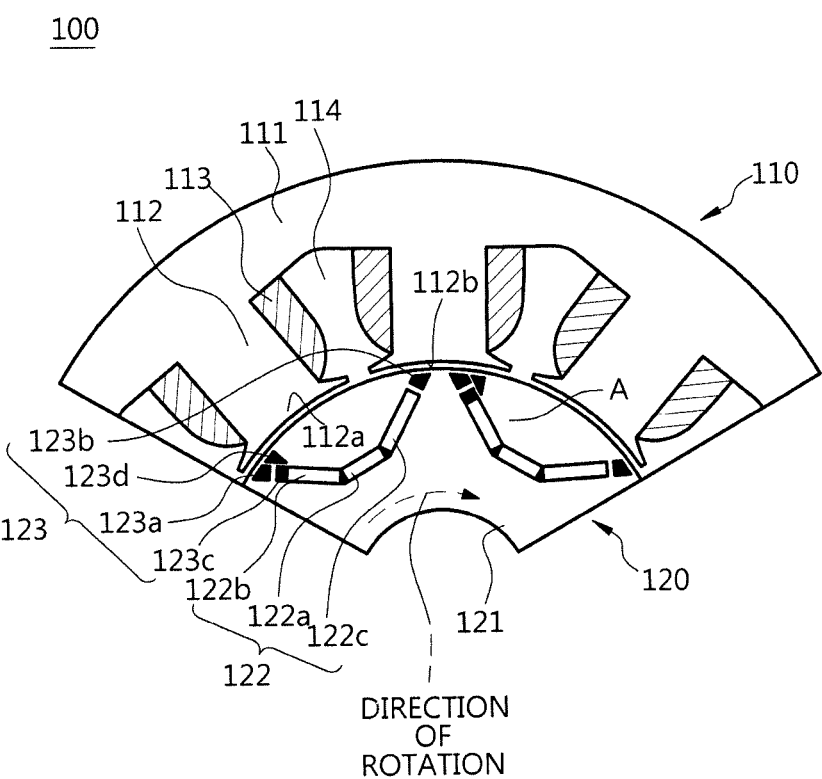
FIG. 3 is a partial cross-sectional view illustrating a motor according to an embodiment of the disclosure.
Figure 4:
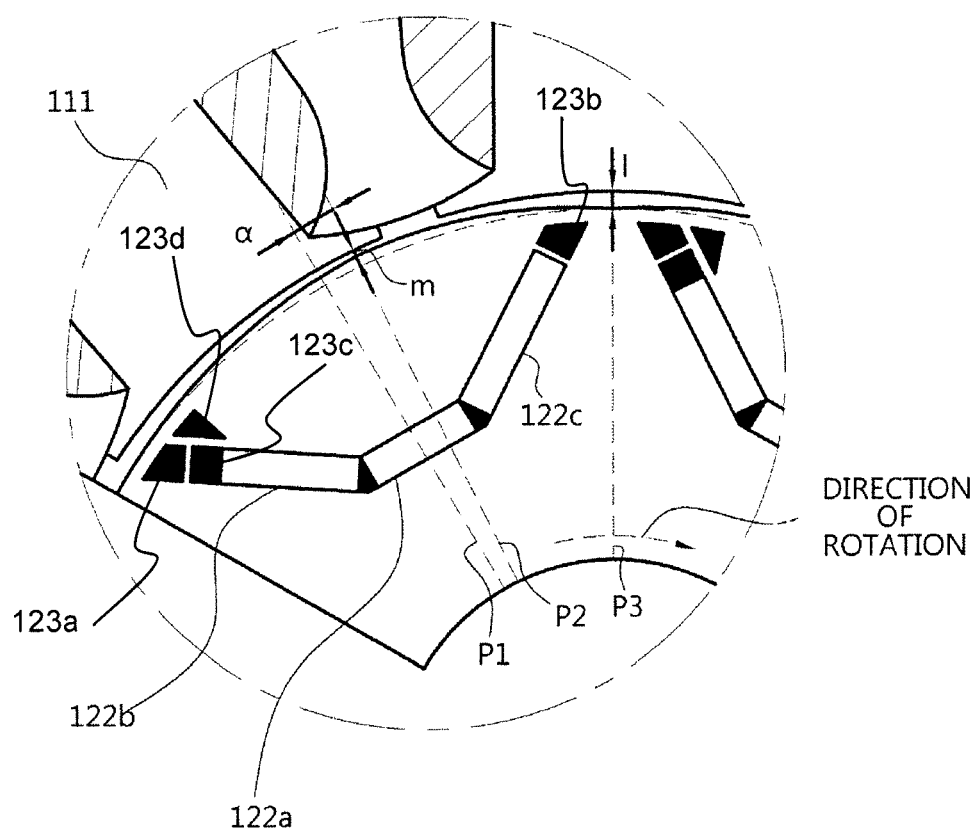
FIG. 4 is an enlarged view illustrating section A shown in FIG. 3.

FIG. 2 is a partial cross-sectional view illustrating a conventional motor, FIG. 3 is a partial cross-sectional view illustrating a motor according to an embodiment of the disclosure, and FIG. 4 is an enlarged view illustrating section A shown in FIG. 3.

Referring to FIGS. 2 to 4, the rotor 120 of the motor 100 may include a rotor body 121 and a permanent magnet group 122, and a flux barrier group 123 adjoining the permanent magnet group 122 may be formed at the rotor body 121.

The rotor body 121 may be formed around the shaft A in a cylindrical shape and configured or arranged with a magnetic substance magnetized by a magnetic field. The rotor body 121 may be fabricated by stacking metal plates having the shape of the rotor body 121 as shown in FIG. 1.

A rotor body 21 of a motor 1 according to the conventional art (hereinafter, referred to as a conventional motor) has a cross section 21a forming a perfect circle as shown in FIG. 2. The space between a conventional stator 10 and a conventional rotor 20, i.e., the air gap is uniform along the circumference of the rotor 20.

In contrast, the rotor body 121 of the motor 100 of an embodiment of the disclosure may have a cylindrical shape protruding to one side. That is, the space, i.e, the air gap between the stator 110 and the rotor 120 is not uniform along the circumference of the rotor 120 and the cross section does not form a perfect circle.

As shown in FIG. 4, the radius of a portion of the rotor body 121 having the permanent magnet group 122 embedded may be different from the other portion having no permanent magnet group 122 embedded.

Specifically, the radius of the portion of the rotor body 121 having the permanent magnet group 122 embedded is greater than the other portion of the rotor body 121 having no permanent magnet group 122 embedded. That is, the width m of the air gap at the portion with the embedded permanent magnet group 122 is less than the width l of the air gap at the other portion without the permanent magnet group 122.

Particularly, a portion P2 of the rotor body 121 having the longest radius deviates from the center of the embedded permanent magnet group 122, i.e., the center P1 of the pole of the rotor 120 by $\alpha$ in the direction of rotation of the rotor 120. In other words, position P2 having the narrowest air gap on one pole of the rotor 120 deviates from the center P1 of the pole of the rotor 120 by $\alpha$ in the direction of rotation of the rotor 120.

As the portion P2 having the narrowest air gap deviates from the center P1 of the pole by $\alpha$ in the direction of rotation of the rotor 120, the air gap is asymmetrically formed about the center P1 of the pole.

Herein, $\alpha$ may vary depending upon the number of poles and the number of slots 114. In the case that six poles exist, three pole pairs and nine slots 113 are provided as shown in FIGS. 3 and 4, $\alpha$ may be about 7 degrees.

In addition, the difference between the portion P2 having the longest radius of the rotor body 121 and the portion P3 having the shortest radius of the rotor body 121, i.e., the deviation in the air gap may vary depending upon the size of the air gap and the radius of the rotor body 121. If the air gap is about 0.8 mm, the deviation in the air gap may be about 0.2 mm. In this case, the deviation of the air gap is about 25 percent of the air gap, for example. For example, the width m of the air gap at the portion with the embedded permanent magnet group 122 may be about 0.7 mm and the width l of the air gap at the other portion corresponding to portion P3 without the permanent magnet group 122 may be about 0.9 mm (i.e., the deviation is about 0.2 mm).

When the portion P2 having the longest radius (shortest gap) of the rotor body 121 is arranged to deviate from the center P1 of the permanent magnet group 122 in the direction of rotation of the rotor 120, a magnetic field deviating from the center P1 of the permanent magnet group 122 in the direction of rotation of the rotor 120 is generated. That is, magnetic flux is biased in the direction of rotation.

Since the permeability of the magnetic substance constituting the rotor body 121 is higher than that of the air forming the air gap, the magnetic field is concentrated at the rotor body 121 having the higher permeability.

The permanent magnet group 122 may include a first permanent magnet 122a, a second permanent magnet 122b and a third permanent magnet 122c. The first permanent magnet 122a may be disposed in a direction perpendicular to the radial direction of the rotor 120. That is, the first permanent magnet 122a may be disposed such that a magnetic field is created in the radial direction of the rotor 120.

The second permanent magnet 122b and the third permanent magnet 122c may be disposed on both ends of the first permanent magnet 122a. In other words, the second permanent magnet 122b and the third permanent magnet 122c may be disposed such that created magnetic fields are directed outward of the rotor 120 and concentrated toward the magnetic field created by the first permanent magnet 122a. For example, the first, second and third permanent magnets 122a, 122b and 122c may be disposed in a U shape open toward the outside of the rotor 120 as shown in FIG. 3. As stated above, the first permanent magnet 122a may be disposed in a direction perpendicular to the radial direction of the rotor 120. For example, the second permanent magnet 122b may be disposed at a first end of the first permanent magnet 122a and bent at a first angle toward the plurality of teeth, away from the first permanent magnet 122a. For example, the third permanent magnet 122c may be disposed at a second end of the first permanent magnet 122a opposite of the first end and be bent at a second angle toward the plurality of teeth and away from the first permanent magnet 122a. The first and second angle may be the same or may be different, for example.

The first, second and third permanent magnets 122a, 122b and 122c of the neighboring permanent magnet groups 122 may be disposed such that different magnetic poles of the neighboring permanent magnet groups 122 face outward of the rotor body 121. For example, when the permanent magnet included in the permanent magnet group shown on the left side in FIG. 3 is disposed such that the north (N) pole thereof faces outward of the rotor body 121, the permanent magnet included in the permanent magnet group shown on the right side in FIG. 3 is disposed such that the south (S) thereof faces outward of the rotor body 121. As a result, N poles and S poles may be alternately arranged along the outer circumferential surface of the rotor body 121.

The flux barrier group 123 may include a plurality of magnetic flux barriers formed of a non-magnetic material to interrupt magnetic flux generated by the permanent magnets 121. For example, the magnetic flux barriers interrupting magnetic flux may be created by forming a hole at a position corresponding to the flux barrier group 123.

The flux barrier group 123 of the motor 100 may include a first flux barrier 123a, a second flux barrier 123b, a third flux barrier 123c, and a fourth flux barrier 123d. The first flux barrier 123a and second flux barrier 123b may be formed at both ends of the permanent magnet group 122. For example, the first flux barrier 123a may be disposed near or adjacent to an end of the second permanent magnet 122b, and the second flux barrier 123b may be disposed at an end of the second permanent magnet 122b. The third flux barrier 123c may have a size corresponding to the difference in size between the third permanent magnet 122c and the second permanent magnet 122b. The fourth flux barrier 123d may be formed near the second permanent magnet 122b positioned at the side of the rotor 120 facing in the opposite direction of rotation.

Hereinafter, the rotor 20 of the conventional motor 1 is compared with the rotor 120 according to an embodiment with reference to FIGS. 2 to 4. In the case of the conventional motor 1, the second permanent magnet 22b and the third permanent magnet 22c, which are disposed on both sides of the first permanent magnet 22a, have the same size as shown in FIG. 2. On the other hand, in the case of the motor 100 according to an embodiment, the second permanent magnet 122b and the third permanent magnet 122c disposed on both sides of the first permanent magnet 122a have different sizes as shown in FIG. 3. The size of the second permanent magnet 122b positioned on one side of the rotor 120 facing in the opposite direction of rotation is less than that of the third permanent magnet 122c.

In addition, the conventional flux barrier group 23 of the conventional motor 1 may include the first flux barrier 23a and second flux barrier 23b which are provided at both ends of the conventional permanent magnet group 22. On other hand, the motor 100 according to an embodiment may include the first flux barrier 123a, the second flux barrier 123b, the third flux barrier 123c and the fourth flux barrier 123d. The third flux barrier 123c and the fourth flux barrier 123d may be positioned on the opposite sides of the rotor 120 in the direction of rotation.

As a result, a greater magnetic field is produced in the direction of rotation of the rotor 120 by the asymmetrically formed permanent magnet group 122. In addition, the magnetic field is concentrated in the direction of rotation of the rotor 120 by the asymmetrically formed flux barrier group 123. That is, the produced magnetic flux is biased in the direction of rotation.

In addition, the rotor 120 of the motor 100 may include a rotor body 121 which is convex at a position on the rotor body 121 biased with respect to the center of the permanent magnet group 122 in the direction of rotation rather than formed in the shape of a perfect circle. As a result, the magnetic flux may be biased with respect to the center of the permanent magnet group 122 and concentrated in the direction of rotation of the rotor 120.

In the above description, the configuration or arrangement of the motor 100 according to an embodiment has been compared with that of the conventional motor 1.

Hereinafter, operation of the motor 100, particularly the output of the motor 100 will be described.

To increase the output of the motor rotating at a constant speed, the torque produced by the motor needs to be increased.

Torque produced by an IPM motor such as motor 100 having permanent magnets embedded in the rotor body may include a magnetic torque Tm and a reluctance torque Tr. Herein, magnetic torque Tm represents a torque produced through magnetic interaction between the permanent magnet and the coil, and the reluctance torque represents a torque produced by the property of a magnetic substance which tends to be aligned in the direction in which the magnetic resistance of a magnetic circuit is minimized in a magnetic field.

Specifically, the torque produced by the motor is shown in Equation 1.

$$T = P_n\{\Psi_a i_q + (L_d - L_q) i_d i_q\} \qquad \text{Equation 1}$$
$$= P_n\left\{\Psi_a I_a \cos\beta + \frac{1}{2}(L_q - L_d) I_a^2 \sin 2\beta\right\}$$
$$= T_m + T_r$$

(Herein, T is a torque, Tm is a magnetic torque, Tr is a reluctance torque, Pn is the number of pole pairs, ψa is flux linkage, id is d-axis current, Ld is d-axis inductance, iq is q-axis current, Lq is q-axis inductance, Ia is driving current, and β is a phase angle of the current.)

In Equation 1, the term Pn×ψa×iq on the right side of the equal sign, which may be replaced by Pn×ψa×Ia×cos β, indicates or corresponds to the magnetic torque Tm.

Thus, the magnetic torque Tm may be increased by increasing the number of pole pairs (Pn), the flux linkage ψa, or the q-axis current iq, i.e., the driving current.

For example, the flux linkage ψa may be increased by increasing the quantity of the permanent magnets or the number of turns of the coil.

In addition, increase of flux linkage ψa means or results in an increase of back electromotive force (back-EMF) E produced in the coil when the motor is driven. The relationship between the flux linkage ψa and the back electromotive force E is expressed in Equation 2. Measuring the back electromotive force E is easier than measuring the flux linkage ψa. That is, by measuring the back electromotive force, the flux linkage ψa may be calculated.

$$E = \frac{d\Psi_a}{dt} = N\frac{d\Psi}{dt} \qquad \text{Equation 2}$$

(Herein, E is back electromotive force, ψa is flux linkage, t is time, N is the number of turns of the coil, and ψ is magnetic flux.)

Increasing the number of pole pairs or the quantity of permanent magnets is structurally limited. Increasing the number of turns of the coil may increase the inductance by the coil, thereby degrading the performance of the motor. In addition, increasing the driving current is limited by the limitation of supply voltage applicable to the motor.

In Equation 1, the term Pn×Ld−Lq×id×iq on the right side of the equal sign, which may be replaced by Pn×Lq−Ld× Ia2×sin 2β, indicates or corresponds to reluctance torque Tr.

The value of Lq is generally greater than that of Ld. Since the value of Lq is greater than that of Ld, the value of Ld−Lq is negative (−), and the value of Lq−Ld is positive (+). In addition, since the value of id is negative (−) and the value of iq is positive (+), the reluctance torque Tr has a positive (+) value.

Accordingly, by increasing the value of Lq−Ld, the value of the reluctance torque Tr may increase. In other words, by increasing the difference between the q-axis inductance and the d-axis inductance, the reluctance torque Tr may increase.

Hereinafter, torque of the motor 100 according to an embodiment will be compared with torque of the conventional motor 1. Though there are multiple structural differences illustrated in FIGS. 1 to 4, the motor 100 and the conventional motor 1 will be assumed to have the same number of poles of the rotor and the same driving current.

The magnetic torque Tm will be described first.

Since the motor 100 and the conventional motor 1 are assumed to have the same number of poles and the same driving current as mentioned above, the value of the magnetic torque Tm is determined according to the flux linkage ψa.

As illustrated in Equation 1, the magnetic torque Tm of the motor is proportional to the flux linkage ψa. As illustrated in Equation 2, the flux linkage may be calculated by integration of the back-EMF E with respect to time.

Figure 5:
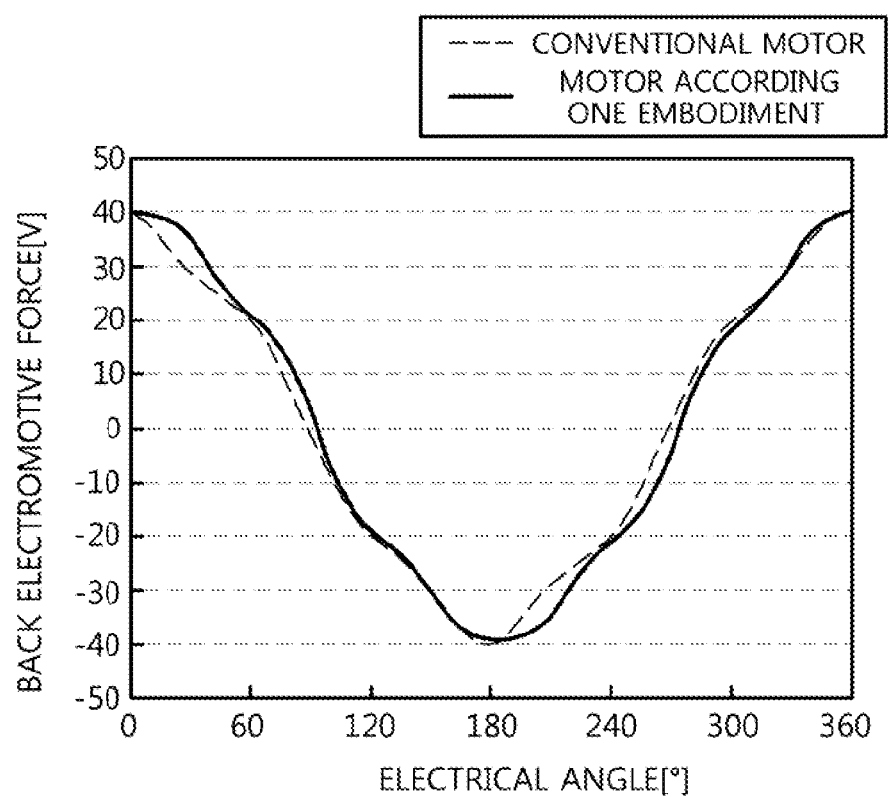
FIG. 5 is a view comparing the back electromotive force of the motor according to an embodiment of the disclosure with the back electromotive force of the conventional motor.
Figure 6:
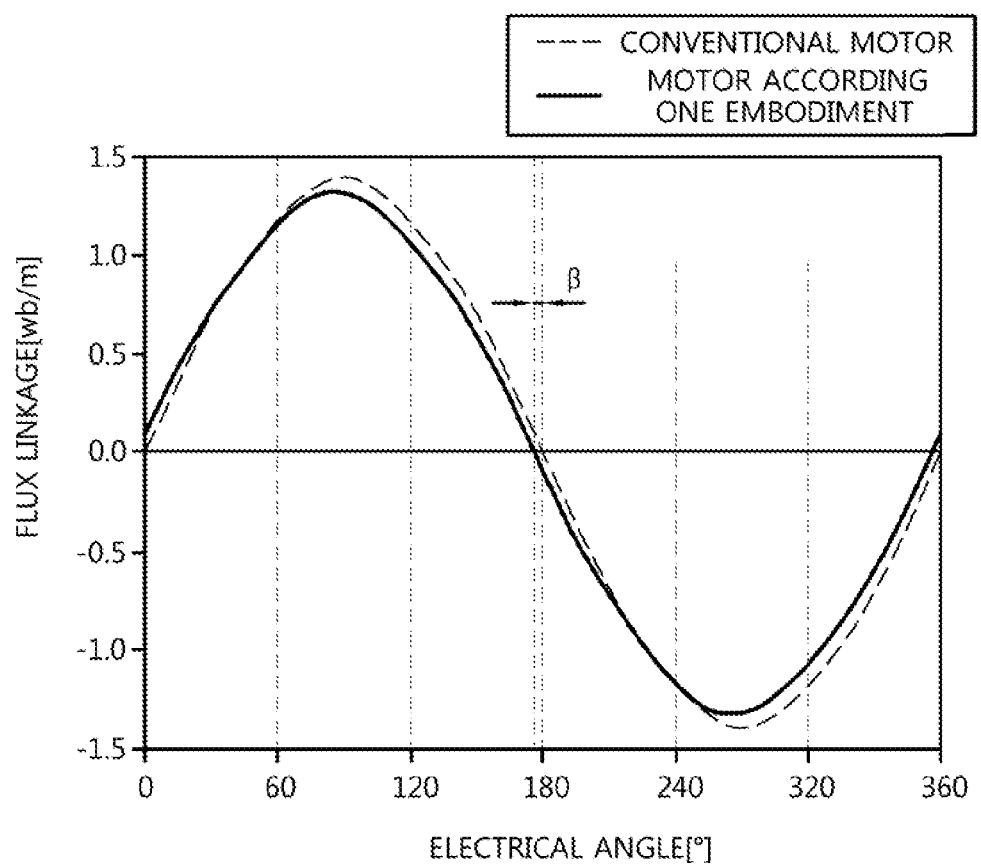
FIG. 6 is a view comparing the flux linkage of the motor according to an embodiment of the disclosure with the flux linkage of the conventional motor.

FIG. 5 is a view comparing the back electromotive force of the motor according to an embodiment of the disclosure with the back electromotive force of the conventional motor, and FIG. 6 is a view comparing the flux linkage of the motor according to an embodiment of the disclosure with the flux linkage of the conventional motor.

In FIG. 5, the x-axis represents the electrical angle, and the y-axis represents the back-EMF E. In FIG. 6, the x-axis represents the electrical angle, and the y-axis represents the flux linkage ψa.

Herein, the electrical angle may refer to an angle of rotation covered by the rotor during a full cycle of alternating current flowing through the coil of the stator and converted into 360 degrees. That is, the electrical angle is a mechanical angle occupied by one pair of an N pole and an S pole of the rotor and converted into 360 degrees. For example, in the case that the rotor includes six poles and thus three pole pairs as shown in FIG. 1, one pair of an N pole and an S pole occupies a mechanical angle of 120 degrees. Thus, the mechanical angle of 120 degrees corresponds to the electrical angle of 360 degrees.

Referring to FIG. 5, the back-EMF E according to the electrical angle of the motor 100 and conventional motor 1 has the maximum value when the electrical angle is about 0, and decreases as the electrical angle increases. The back-EMF E becomes about 0 when the electrical angle reaches about 90 degrees. Thereafter, the back-EMF E further decreases as the electrical angle increases and has the minimum value when the electrical angle is about 180 degrees. Thereafter, the back-EMF E increases again until the electrical angle becomes 360 degrees. In this way, the back-EMF E repeatedly increases and decreases according to the electrical angle of the motor.

Referring to FIG. 6, the flux linkage ψa of the motor 100 and the conventional motor 1, which varies with the back-EMF E shown in FIG. 5, is about 0 when the electrical angle is about 0 degrees. As the electrical angle increases, the flux linkage ψa increases. Thereby, the flux linkage ψa has the maximum value when the electrical angle is about 90 degrees. Thereafter, the flux linkage ψa decreases while the electrical angle increases. The flux linkage ψa becomes about 0 when the electrical angle is about 180 degrees. The flux linkage ψa has a minimum value when the electrical angle is about 270 degrees.

Particularly, as shown in FIG. 6, the electrical angle of the motor 100 at which the flux linkage ψa becomes about 0 is ahead of the electrical angle of the conventional motor 1 at which the flux linkage ψa becomes about 0 by angle β. That is, the flux linkage ψa of the motor 100 differs from the flux linkage ψa of the conventional motor 1 by an electrical angle β.

This is because, in the case of the motor 100, the air gap has the smallest width at a portion P2 of the rotor 120 (see FIG. 4) biased by angle α in the direction or rotation of the rotor 120 with respect to the center P1 of the poles (see FIG. 4), and a plurality of magnetic flux barriers are positioned at one of the two ends of the permanent magnet group 120 which is behind the other end in the direction of rotation of the rotor 120, as illustrated in FIGS. 2 to 4. That is, the magnetic field may be concentrated in the direction of rotation of the rotor 120.

As the magnetic field is concentrated in the direction of rotation of the rotor 120, the flux linkage ψa of the motor 100 changes faster than that of the conventional motor 1 by angle β.

In addition, the maximum value of the flux linkage ψa of the motor 100 is less than the maximum value of the flux linkage ψa of the conventional motor 1, as shown in FIG. 6.

This is because the motor 100 uses a lower quantity of permanent magnets than the conventional motor 1. In other words, when the motor 100 uses a lower quantity of permanent magnets than the conventional motor 1, the magnitude of the total magnetic flux generated by the motor 100 is less than that of the conventional motor 1. Thereby, the magnitude of the flux linkage ψa is also lowered.

As shown in FIGS. 5 and 6, the magnitude of the flux linkage ψa of the motor 100 is less than that of the conventional motor 1. Therefore, the magnetic torque Tm of the motor 100 may be lower than the magnetic torque Tm of the conventional motor 1 according to Equation 1.

Next, the reluctance torque Tr will be described below.

Since the motor 100 and the conventional motor 1 are assumed to have the same number of poles and the same driving current as mentioned above, the value of the reluctance torque Tr may be determined according to Lq–Ld, the difference between the d-axis inductance and the q-axis inductance.

Figure 7:
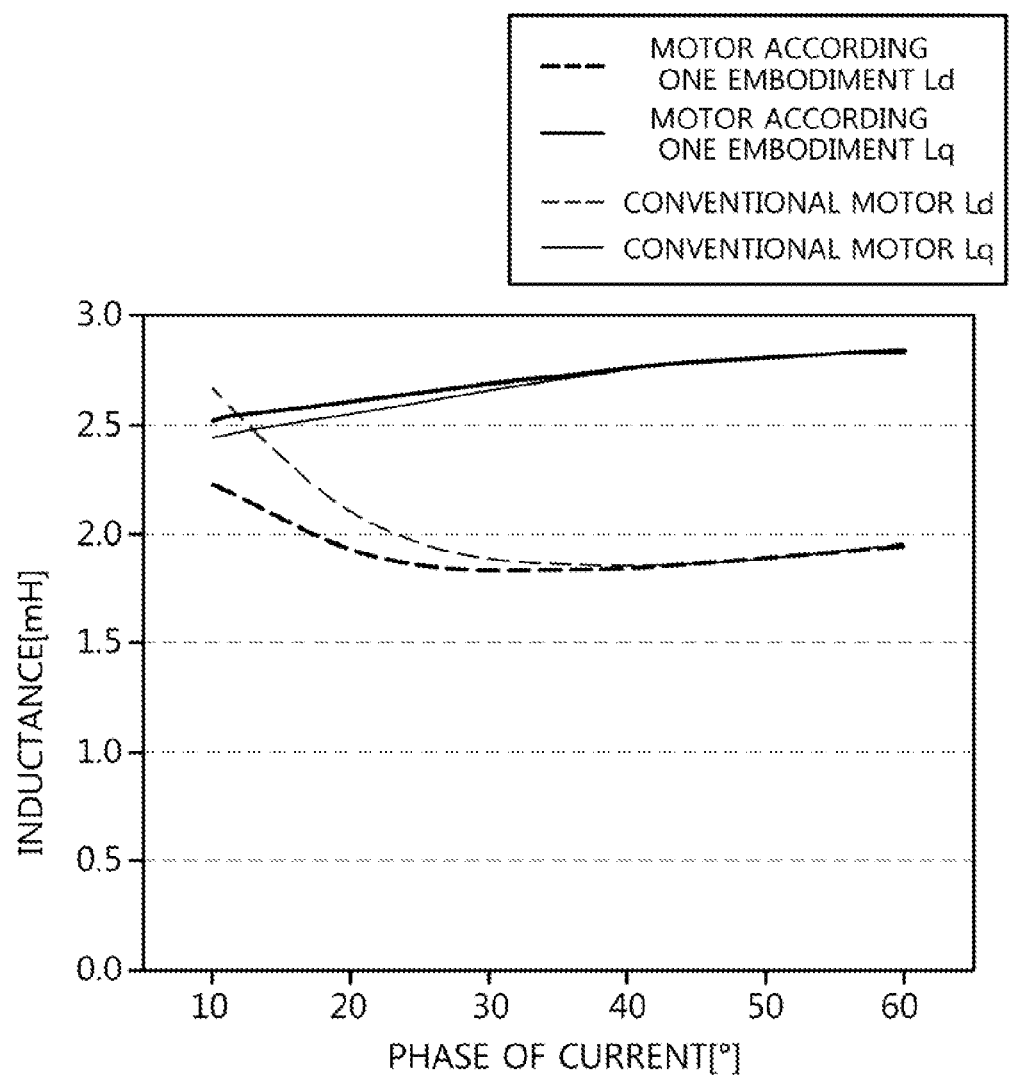
FIG. 7 is a view comparing the inductance of the motor according to an embodiment of the disclosure with the inductance of the conventional motor.
Figure 8:
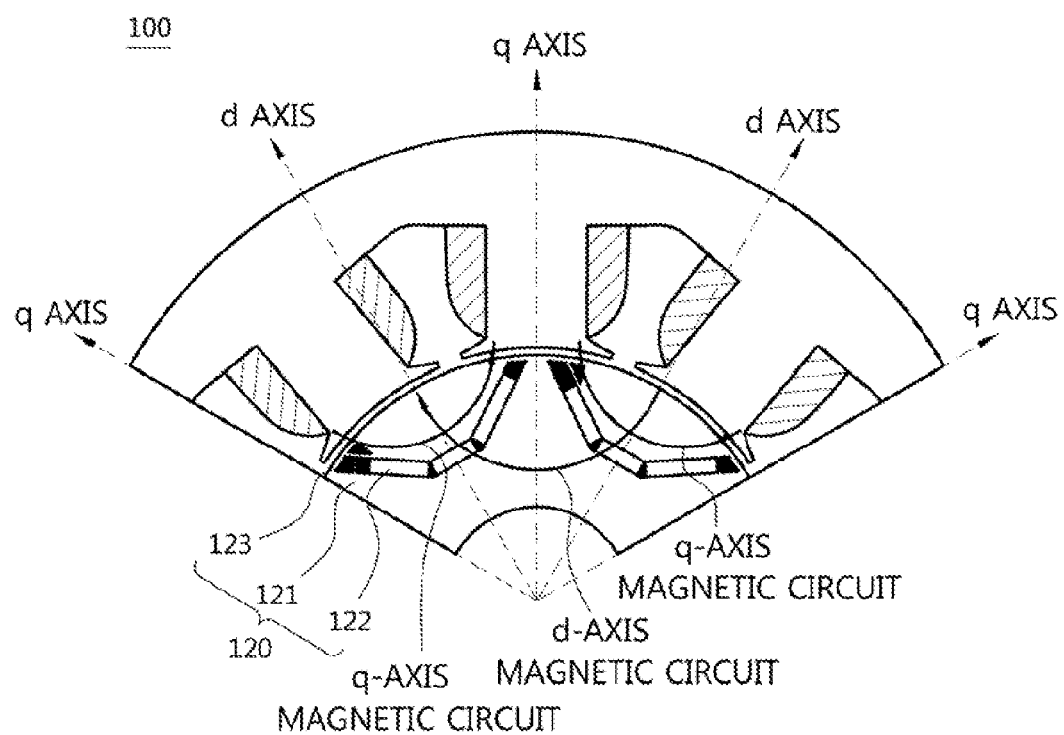
FIG. 8 is a view illustrating a magnetic circuit of the motor according to an embodiment.

FIG. 7 is a view comparing the inductance of the motor according to an embodiment of the disclosure with the inductance of the conventional motor, and FIG. 8 is a view illustrating a magnetic circuit of the motor according to an embodiment.

Referring to FIG. 7, the values of the d-axis inductance Ld and q-axis inductance Lq vary with the current phase angle β of the driving current.

Specifically, the d-axis inductance Ld decreases as the current phase angle β of the driving current increases. The d-axis inductance Ld begins to gradually increase when the current phase angle β increase beyond about 30 degrees. On the other hand, the q-axis inductance Lq consistently increases as the current phase angle β of the driving current increases. In addition, in most ranges of the current phase angle β, the q-axis inductance Lq is greater than the d-axis inductance Ld.

In addition, in most ranges of the current phase angle β, Lq–Ld of the motor 100, i.e., the difference between the q-axis inductance Lq and the d-axis inductance Ld of the motor 100 is greater than Lq–Ld of the conventional motor 1, the difference between the q-axis inductance Lq and the d-axis inductance Ld of the conventional motor 1.

This is because the magnetic field of the motor 100 may be more concentrated in the direction of rotation of the rotor 120 that the magnetic field of the conventional motor 1.

As shown in FIG. 8, the d-axis magnetic circuit may be formed through the permanent magnet group 122, and the q-axis magnetic circuit may be formed along the permanent magnet group 122.

As illustrated in FIGS. 2 to 4, the structure of the motor 100 causes a magnetic field to be slightly biased in the direction of rotation of the rotor 120 with respect to the center of poles, i.e., the center of the permanent magnet group 122.

As a result, the motor 100 may have a reduced amount of magnetic flux passing through the d-axis magnetic circuit and an increased amount of magnetic flux passing through the q-axis magnetic circuit, compared to the conventional motor 1.

As the amount of magnetic flux passing through the d-axis magnetic circuit is reduced, the reluctance of the d-axis magnetic circuit increases and the value of Ld×id decreases. Since it is assumed that there is no difference in the d-axis current id between an embodiment of the disclosure and the conventional art, the d-axis inductance Ld of the motor 100 decreases.

In addition, since the amount of magnetic flux passing through the q-axis magnetic circuit increases, the magnetic resistance of the q-axis magnetic circuit decreases and the value of Lq×iq increases. Since it is assumed that there is no difference in the q-axis current iq between the example embodiment and the conventional art, the q-axis inductance Lq of the motor 100 increases.

As a result, the difference between the q-axis inductance and the d-axis inductance Lq−Ld in the motor 100 is greater than the difference between the q-axis inductance and the d-axis inductance Lq−Ld in the conventional motor 1.

Since the difference between the q-axis inductance and the d-axis inductance Lq−Ld in the motor 100 is greater than the difference between the q-axis inductance and the d-axis inductance Lq−Ld in the conventional motor 1, the reluctance torque Tr of the motor 100 is greater than the reluctance torque Tr of the conventional motor 1.

Consequently, the motor 100 produces a reduced magnetic torque Tm over the conventional motor by reducing usage of the permanent magnets, while increasing the reluctance torque Tr by biasing the magnetic field in the direction of rotation.

Hereinafter, torque T of the motor 100 will be described.

Figure 9:
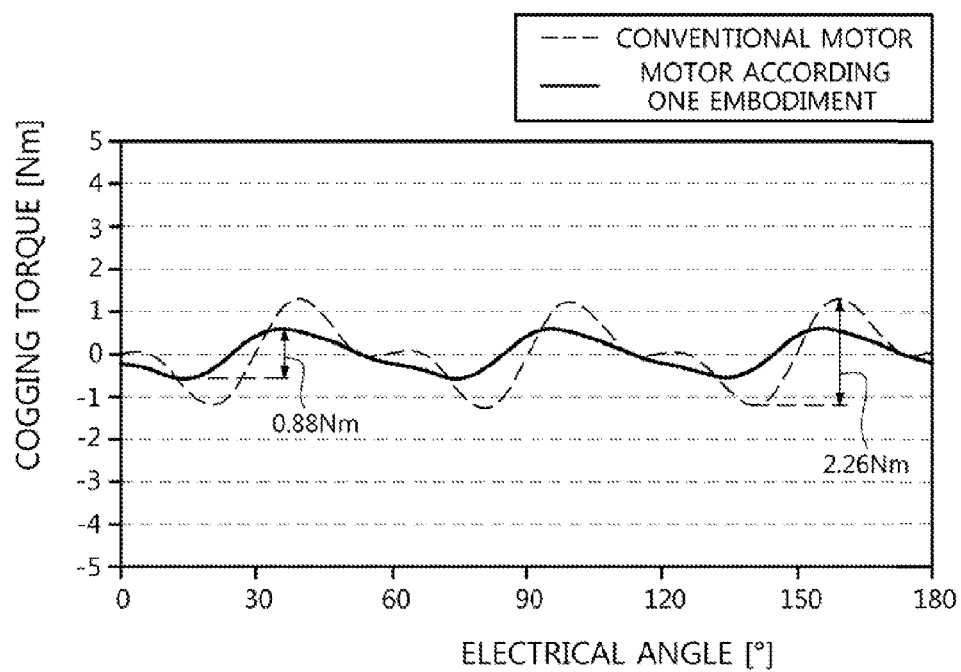
FIG. 9 is a view comparing the cogging torque of the motor according to an embodiment with the cogging torque of the conventional motor.
Figure 10:
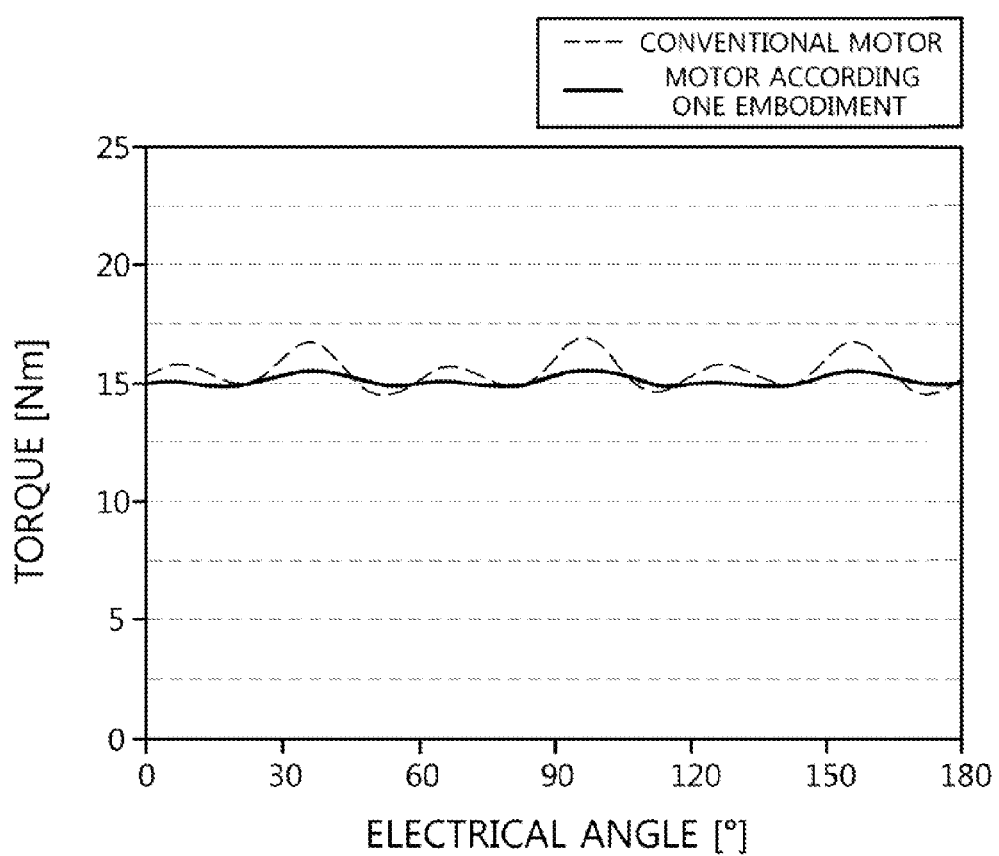
FIG. 10 is a view comparing the torque of the motor according to an embodiment with the torque of the conventional motor.
Figure 11:
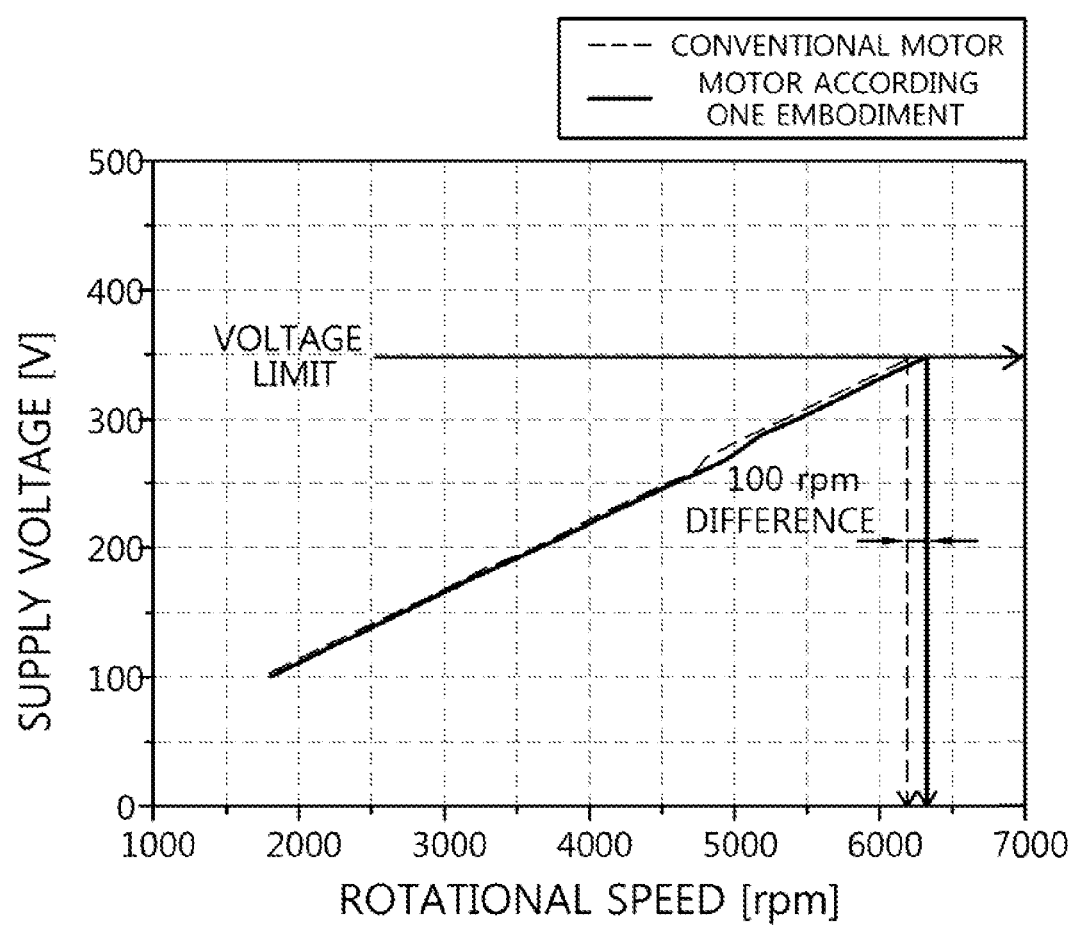
FIG. 11 is a view comparing the maximum revolutions per minute of the motor according to an embodiment with the maximum revolutions per minute of the conventional motor.

FIG. 9 is a view comparing the cogging torque of the motor according to an embodiment with the cogging torque of the conventional motor, FIG. 10 is a view comparing the torque of the motor according to an embodiment with the torque of the conventional motor, and FIG. 11 is a view comparing the maximum revolutions per minute of the motor according to an embodiment with the maximum revolutions per minute of the conventional motor.

Referring to FIG. 9, the value of the maximum cogging torque of the conventional motor 1 is about 2.26 N·m, while the value of the maximum cogging torque of the motor 100 is about 0.88 N·m.

Cogging torque is a pulsating torque that is generated to maintain a position at which reluctance is minimized in a magnetic circuit including the permanent magnets of the rotor, the teeth of the stator, and the air gap. Cogging torque leads to torque ripple in operation of the motor. Decrease in cogging torque means decrease of torque ripple in operation of the motor. Therefore it may be desirable to reduce the cogging torque to reduce torque ripple.

As shown in FIG. 9, when the cogging torque of the motor 100 decreases, torque ripple in operation of the motor 100 decreases as well.

Specifically, as shown in FIG. 10, the torque ripple in the conventional motor 1 is about 18.3%, while the torque ripple of this embodiment is about 4.7%.

In addition, referring to FIG. 10, the average torque of the conventional motor 1 is about 15.5 N·m, while the average torque of the motor 100 is about 15.3 N·m. That is, the average torque of the motor 100 does not greatly differ from the average torque of the conventional motor 1.

As such, the motor 100 may maintain the level of the average torque of the conventional motor 1 and has a reduced torque ripple over the conventional motor 1, while usage of permanent magnets in the motor 100 is reduced over the conventional motor 1.

In addition, according to experimentation and/or simulation, when the same voltage is applied, the maximum rotational speed of the motor 100 is greater than that of the conventional motor 1, as shown in FIG. 11. For example, when direct current voltage of about 340 V is applied, the maximum rotational speed of the motor 100 is greater than that of the conventional motor 1 by about 100 rpm.

In conclusion, the motor 100 may reduce production costs over the conventional motor 1, while exhibiting the performance of the conventional motor 1 or better performance regarding the torque ripple and the maximum rotational speed.

As is apparent from the above description, according to an embodiment of the disclosure, the shape of a rotor, arrangement of permanent magnets, and/or disposition of a magnetic flux barrier may be asymmetric about the center of poles of the rotor. Thereby, performance of unidirectional rotation of a motor may be improved.

Although example embodiments of the disclosure have been shown and described, it would be appreciated by those skilled in the art that changes may be made to these embodiments without departing from the principles and spirit of the disclosure, the scope of which is defined in the claims and their equivalents.

What is claimed is:
1. A motor, comprising:
a stator; and
a rotor, rotatably arranged inside the stator, the rotor comprising a rotor body, a permanent magnet group provided to the rotor body to generate a magnetic field, and a flux barrier group to interrupt magnetic flux, the rotor body having a radius varying asymmetrically about a point on an outer circumferential surface of the rotor orthogonal to a center of the permanent magnet group,
wherein
the permanent magnet group comprises a plurality of permanent magnets including a first permanent magnet disposed in a direction perpendicular to a radial direction of the rotor,
a first distance, from the center of the rotor to the outer circumferential surface of the rotor, measured along a first line in the radial direction that passes through a center of the first permanent magnet, is less than a second distance, from the center of the rotor to the outer circumferential surface of the rotor, measured along a second line in the radial direction that passes through the first permanent magnet at a point spaced apart from the center of the first permanent magnet in a circumferential direction of the rotor, and
a third distance, from the center of the rotor to the outer circumferential surface of the rotor, measured along a third line in the radial direction that passes outside the permanent magnet group, is a shortest radius of the rotor body.

2. The motor according to claim 1, wherein the permanent magnet group is embedded in the rotor body.

3. The motor according to claim 1, wherein
the plurality of permanent magnets further include a second permanent magnet and a third permanent magnet, and
the second permanent magnet and the third permanent magnet are asymmetrically disposed at opposite ends of the first permanent magnet.

4. The motor according to claim 3, wherein the second permanent magnet and the third permanent magnet are configured to create asymmetric magnetic fields around the first permanent magnet.

5. The motor according to claim 1, wherein
the plurality of permanent magnets further include:
a second permanent magnet positioned at a first side of the first permanent magnet facing in a direction opposite to a direction of rotation of the rotor,
a third permanent magnet positioned at a second side of the first permanent magnet facing in the direction of rotation of the rotor, and
the third permanent magnet is configured to create a greater magnetic field than the second permanent magnet.

6. The motor according to claim 5, wherein a size of the third permanent magnet is greater than a size of the second permanent magnet.

7. The motor according to claim 1, wherein the flux barrier group comprises a plurality of magnetic flux barriers asymmetrically disposed at opposite ends of the permanent magnet group.

8. The motor according to claim 7, wherein a magnetic flux barrier of the plurality of magnetic flux barriers disposed at a first side of the permanent magnet group that faces in a direction opposite to a direction of rotation of the rotor is configured to interrupt more magnetic flux than another magnetic flux barrier disposed at a second side of the permanent magnet group that faces in the direction of rotation of the rotor.

9. The motor according to claim 8, wherein a number of magnetic flux barriers disposed at the first side of the permanent magnet group is greater than a number of magnetic flux barriers disposed at the second side of the permanent magnet group.

10. The motor according to claim 1, wherein a position on the outer circumferential surface of the rotor that defines a longest distance between the outer circumferential surface and the center of the rotor is spaced a predetermined angle, from the first line in the radial direction, in a direction of rotation of the rotor.

11. The motor according to claim 1, wherein a width of the air gap between the rotor and the stator decreases from a first position on the outer circumferential surface of the rotor that lies along the first line in the radial direction to a second position on the outer circumferential surface of the rotor that lies along the second line in the radial direction, in a direction of rotation of the rotor.

12. The motor according to claim 1, wherein
a plurality of permanent magnet groups are provided to the rotor body, and
the air gap between the rotor and stator has a greatest size at a portion of the rotor body between adjacent permanent magnet groups.

13. A motor, comprising:
a stator; and
a rotor, rotatably arranged inside the stator, the rotor comprising a rotor body, a plurality of permanent magnet groups provided to the rotor body to generate a magnetic field, and a flux barrier group to interrupt magnetic flux,
wherein
a size of an air gap formed between the stator and an outer circumference of the rotor body varies asymmetrically about a point on an outer circumferential surface of the rotor orthogonal to a center of a permanent magnet group of the plurality of permanent magnet groups,
the permanent magnet group comprises a plurality of permanent magnets including a first permanent magnet disposed in a direction perpendicular to a radial direction of the rotor body,
a first size of the air gap, measured in the radial direction from a first position at an outer circumferential surface of the rotor body to the stator, is greater than a second size of the air gap, measured in the radial direction from a second position at the outer circumferential surface of the rotor body to the stator,
the first position at the outer circumferential surface of the rotor body lies along a first line in the radial direction that passes through a center of the first permanent magnet, and
the second position at the outer circumferential surface of the rotor body lies along a second line in the radial direction that passes through the first permanent magnet at a point spaced apart from the center of the first permanent magnet in a circumferential direction of the rotor body, and
a third size of the air gap, measured in the radial direction from a third position at an outer circumferential surface at a portion of the rotor body between adjacent permanent magnet groups to the stator, is greater than the first size of the air gap and the second size of the air gap.

14. The motor according to claim 13, wherein:
the plurality of permanent magnets further include a second permanent magnet disposed on one side of the first permanent magnet, and a third permanent magnet disposed on the other side of the first permanent magnet, and
a size of the third permanent magnet is greater than a size of the second permanent magnet.

15. The motor according to claim 13, wherein:
the flux barrier group comprises a first flux barrier disposed on one end of the permanent magnet group, a second flux barrier disposed on the other end of the permanent magnet group, and a third flux barrier disposed between the first flux barrier and the one end of the permanent magnet group.

16. The motor according to claim 15, wherein:
the flux barrier group further comprises a fourth flux barrier disposed adjacent to the one end of the permanent magnet group, at a side of the permanent magnet group closer to the outer circumference of the rotor body than a center of the rotor body.

17. A motor, comprising:
a stator; and
a rotor, rotatably arranged inside the stator such that an air gap is formed between an outer circumference of the rotor and an inner circumference of the stator, the rotor comprising a rotor body, a permanent magnet group provided to the rotor body to generate a magnetic field, and a flux barrier group to interrupt magnetic flux, wherein:

the permanent magnet group comprises a plurality of permanent magnets including a first permanent magnet, a second permanent magnet disposed on a first side of the first permanent magnet, and a third permanent magnet disposed on a second side of the first permanent magnet, a size of the third permanent magnet is greater than a size of the second permanent magnet, the flux barrier group comprises a greater number of flux barriers disposed at one end of the permanent magnet group than at the other end of the permanent magnet group, a size of one of the flux barriers disposed at the one end of the permanent magnet group corresponds to a difference in size between the third permanent magnet and the second permanent magnet, and a size of the air gap is asymmetrical about a first point on the outer circumference of the rotor orthogonal to a center of the first permanent magnet, and the size of the air gap is greatest at a second point on the outer circumference of the rotor between the permanent magnet group and an adjacent permanent magnet group.

18. The motor according to claim 17, wherein:

the flux barrier group comprises a first flux barrier disposed at one side of the second permanent magnet, a second flux barrier disposed at one side of the third permanent magnet, and a third flux barrier disposed between the first flux barrier and the one side of the second permanent magnet, and the third flux barrier has the size corresponding to the difference in size between the third permanent magnet and the second permanent magnet.

* * * * *